US009464577B2

(12) United States Patent
Galka et al.

(10) Patent No.: US 9,464,577 B2
(45) Date of Patent: Oct. 11, 2016

(54) ROTARY POSITION SENSOR WITH BUFFER

(75) Inventors: William E. Galka, Caro, MI (US); David L. Speirs, Cass City, MI (US)

(73) Assignee: Walbro LLC, Tucson, AZ (US)

( * ) Notice: Subject to any disclaimer, the term of this patent is extended or adjusted under 35 U.S.C. 154(b) by 828 days.

(21) Appl. No.: 13/602,675

(22) Filed: Sep. 4, 2012

(65) Prior Publication Data
US 2013/0068974 A1    Mar. 21, 2013

Related U.S. Application Data

(60) Provisional application No. 61/536,525, filed on Sep. 19, 2011.

(51) Int. Cl.
*F16K 37/00* (2006.01)
*F02D 9/10* (2006.01)
*F16K 1/22* (2006.01)
*G01D 5/14* (2006.01)

(52) U.S. Cl.
CPC .............. *F02D 9/105* (2013.01); *F16K 1/22* (2013.01); *F16K 37/0033* (2013.01); *F16K 37/0041* (2013.01); *G01D 5/145* (2013.01)

(58) Field of Classification Search
USPC .................................... 137/554; 251/129.04
See application file for complete search history.

(56) References Cited

U.S. PATENT DOCUMENTS

| 5,609,184 A * | 3/1997 | Apel et al. ............ 137/554 |
| 6,892,698 B2 * | 5/2005 | Kino et al. ............ 123/337 |
| 2007/0290680 A1 * | 12/2007 | Hattori ............ 324/207.25 |
| 2010/0258099 A1 | 10/2010 | Andersson et al. |

* cited by examiner

*Primary Examiner* — Craig Schneider
*Assistant Examiner* — Angelisa L Hicks
(74) *Attorney, Agent, or Firm* — Reising Ethington, P.C.

(57) ABSTRACT

A rotary position sensor for determining the rotary position of a rotary component may include a sensor and a magnet. The sensor may be responsive to a characteristic of a magnetic field that changes as the magnetic field moves. The magnet may be carried by the rotary component for rotation with the rotary component. A buffer may be provided around the magnet to limit distortion of the magnet field. The buffer is effective against objects normally located in the area of a device with which the sensor is used (e.g. adjacent components) as well as against foreign objects not normally in the area of the device.

18 Claims, 4 Drawing Sheets

ROTARY POSITION SENSOR WITH BUFFER

REFERENCE TO CO-PENDING APPLICATION

This application claims the benefit of U.S. Provisional Application No. 61/536,525 filed Sep. 19, 2011, which is incorporated herein by reference in its entirety.

TECHNICAL FIELD

The present disclosure relates generally to a position sensor for a rotary component, for example, a shaft and/or valve.

BACKGROUND

Many engines utilize a throttle valve to control or throttle air flow to the engine in accordance with a demand on the engine. Such throttle valves may be used, for example, in throttle bodies of fuel injected engine systems and in carburetors of carbureted engine systems. Many such throttle valves include a valve head carried on a shaft that is rotated to change the orientation of the valve head relative to fluid flow in a passage, to vary the flow rate of the fluid in and through the passage. Other applications also use components that rotate, and the position of these components may need to be known for feedback control or other reasons.

SUMMARY

In at least some implementations, a rotary position sensor assembly for determining the rotary position of a rotary component includes a magnet carried by the rotary component for rotation with the rotary component, a sensor responsive to a characteristic of a magnetic field that changes as the magnet rotates or is rotated and a buffer. The buffer is provided around the magnet to limit distortion of the magnet field. Therefore, at least some foreign objects will not be sufficiently close to the sensor to alter the magnetic field experienced by the sensor.

In at least some implementations, a fluid flow control device for a combustion engine, includes a housing, a throttle valve carried by the housing for rotation to vary a flow of fluid past the throttle valve and a magnet carried by the throttle valve for rotation with the throttle valve. A sensor is responsive to a characteristic of a magnetic field that changes as the magnet rotates or is rotated and a buffer is provided around the magnet to limit distortion of the magnet field that may be caused by objects outside of the buffer that are not part of the fluid flow control device.

BRIEF DESCRIPTION OF THE DRAWINGS

The following detailed description of various embodiments and best mode will be set forth with reference to the accompanying drawings, in which.

DETAILED DESCRIPTION OF PREFERRED EMBODIMENTS

Figure 1:
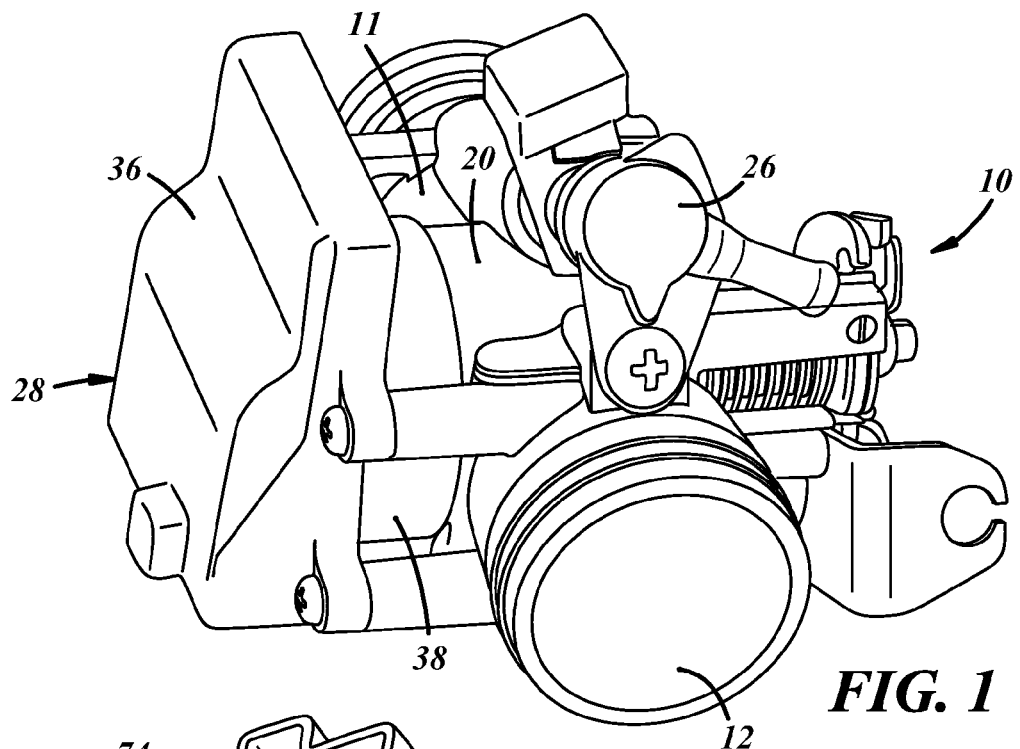
FIG. 1 is a perspective view of a throttle body including a control module with a magnetic rotary position sensor.
Figure 3:
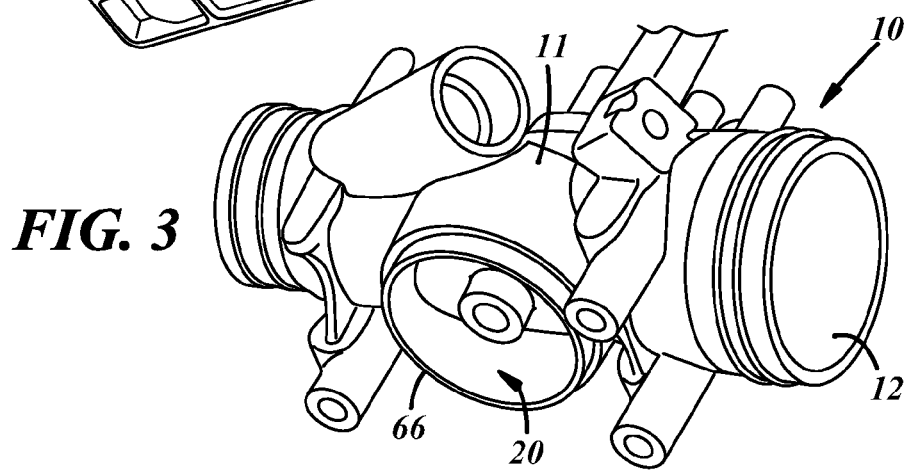
FIG. 3 is a perspective view of the throttle body without the control module housing.

Referring in more detail to the drawings, FIG. 1 illustrates a fluid control device 10 which may be used in a fuel injection based engine fuel delivery system. In this implementation, the fluid control device is a throttle body 10 which may include a main housing 11 that includes an air passage 12 through which air is delivered to the engine, and a throttle valve 14 (FIG. 4) arranged to control air flow through the air passage 12 as a function of the extent to which the valve 14 is open. In the implementation shown, the throttle valve 14 is a butterfly type valve with a flat, disc-shaped valve head 16 located within the air passage 12. The valve head 16 is carried by a rotary throttle valve shaft 18 that extends through the air passage 12 and is rotated between a closed position (or idle position) and a wide open position. An end of the valve shaft 18 may extend outwardly from the housing 11, and may be received at least in part within a cylindrical projection 20 (FIGS. 1 and 3) of the housing 11. In this particular embodiment, a fuel injector 26 (FIG. 1) may be carried by the throttle body 10. Likewise, a control module 28 may also be carried by the throttle body 10.

Figure 4:
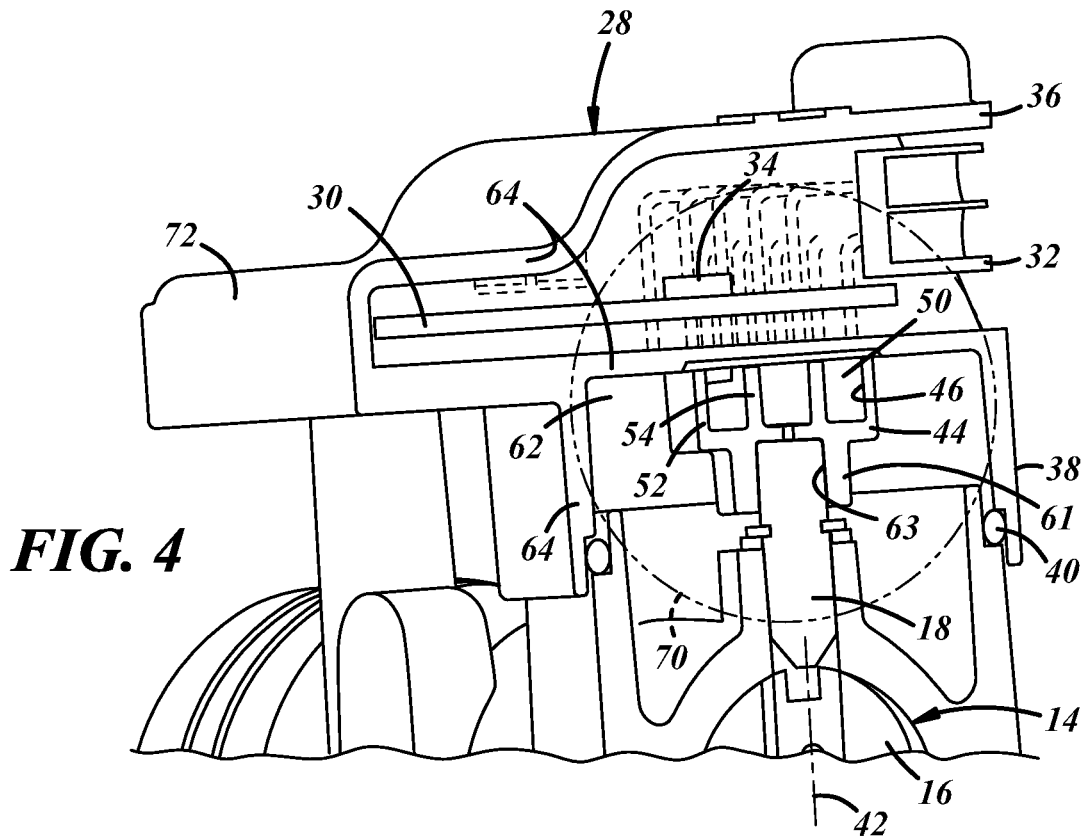
FIG. 4 is a fragmentary sectional view showing a portion of the throttle body and the control module housing and a rotary position sensing arrangement therein.

Referring now to FIG. 4, the control module 28 may include a circuit board 30, one or more controllers or microprocessors, a main connector 32, and a rotary position sensor 34. Referring to FIGS. 1 and 4, the control module 28 may include a housing 36 carried by the throttle body 10. To connect these components together, the housing 36 may have an annular skirt or flange 38 disposed around the projection 20 with a seal 40 (FIG. 4) disposed between them. The rotary position sensor 34 may be disposed on the circuit board 30, in the area of the connection between the housing 36 and projection 20 so that the sensor 34 is located in the area of the end of the throttle valve shaft 18, as will be discussed in more detail later. The circuit board 30 may be located axially spaced (relative to the rotary axis 42 (FIG. 4) of the shaft 18) from an end of the throttle shaft 18, as shown, or the throttle shaft 18 could extend beyond or through a portion of the circuit board 30, if desired. It may be desirable to have the throttle shaft 18 extend through the circuit board, for example, in an application where access to the end of the throttle shaft is desired. The circuit board 30 and/or the sensor 34 may be arranged perpendicular to the axis 42 of the throttle shaft 18, or in any other desired position or orientation.

A rotor component 44 may be fixed to throttle shaft 18, such as by a connector like a key or clip, and include a pocket 46 for retaining a magnet 50. The pocket 46 may be formed by an upstanding outer wall 52 and an upstanding inner wall 54 spaced radially inwardly from the outer wall 52 so that the pocket 46 is annular or generally annular. The outer and inner walls 52, 54 may be circumferentially continuous as shown in FIG. 1, or they may be discontinuous, that is, they may include openings or voids, or be defined by discrete spaced apart segments, pins, fingers or the like. The outer and inner walls 52, 54 may extend axially a similar or different distance from each other, as desired. Rotor component 44, according to the exemplary embodiment shown here, is made from a non-magnetic material, such as plastic, although it could be formed from any material or combination of materials, including a magnetic material. Rotor component 44 can be keyed to throttle shaft 18 or attached in some other way that enables the two components to rotate together. In the form shown in FIG. 4, the rotor component 44 includes an annular stem 61 having a flat portion 63 formed therein and adapted to mate with a complementary flat formed on the throttle valve shaft 18.

The magnet 50 could also be overmolded by the plastic of the rotor component 44 when the rotor component is molded. The magnet 50 could also be adhered, bonded or welded to the rotor component 44 such as by a mechanical or chemical adhesive bond to limit or prevent rotation of the magnet relative to the rotor component. The magnet may also be carried directly by the valve shaft and the anti-rotation feature may engage or otherwise cooperate with the valve shaft to maintain the position of the magnet relative to the valve shaft. In such an arrangement, the rotor component 44 may not be needed.

Magnet 50 may be annular, partially annular or arcuate, or of another desired shape. Magnet 50 produces a magnetic field having a distribution, orientation, direction and/or intensity that may be sensed by rotary position sensor 34, and that, at a given location of the sensor 34, varies according to the rotary position of throttle valve 14. In one embodiment, magnet 50 is made of a permanent magnetic material and is a standard ring magnet that is concentric with the throttle shaft 18. The magnet 50 may be made from a neodymium material, and may have a field strength of between 8 Ampere-Meters and 25 Ampere-Meters in at least certain applications, although other types of magnets and magnets having other strengths may be used, as desired. The magnet 50 may be a single pole set magnet. The magnet 50 and/or the rotor component may include an anti-rotation feature to limit or prevent rotation of the magnet 50 relative to the pocket 46 to maintain a desired orientation of the magnet and a consistent magnetic field therefrom to facilitate determining the rotary position of the throttle valve 14 over time.

In an exemplary embodiment shown in FIGS. 1-4, rotary position sensor 34 is a magnetoresistive (MR) sensor that determines the angular or rotary position of throttle valve 14 by sensing at least one characteristic (for example, direction, distribution, orientation and/or strength) of a magnetic field that changes according to the position of the throttle valve 14. That is, the interface between the rotating magnet 50 and the stationary sensor 34 converts the changing magnetic field into an output voltage that varies depending on rotation of the magnet 50, and hence, on rotation of the throttle valve 14. In one form, the sensor 34 detects the changing magnetic flux direction as the magnet 50 rotates.

Rotary position sensor 34 may be mounted to circuit board 30 so that it can magnetically interact with magnet 50 and provide control module 28 with a signal corresponding to the rotary position of the throttle valve 14. The sensor 34 may include a plurality of magnetoresistive (MR) elements which may be arranged as a pair of angularly offset resistive bridges, as generally described in U.S. Patent Application Publication No. 2010/0258099, published Oct. 14, 2010. In this particular embodiment, rotary position sensor 34 is mounted to circuit board 30 such that the sensor surface is generally parallel to the rotating magnetic field, and the sensor is neither coaxial with the axis 42 of throttle shaft 18 nor is it coplanar with magnet 50. Put differently, rotary position sensor 34 can be mounted radially spaced from the axis 42 of the throttle shaft 18 and axially spaced from the magnet 50. In at least some implementations, the sensor 34 may be axially spaced from the magnet by between about 0 and 15 mm, and in some implementations the distance may be 3 mm to 15 mm. A gap of 6 mm to 7 mm is preferred in at least one implementation as being conducive to high-volume manufacturing taking into account tolerances regarding location of the magnet 50, and various dimensional tolerances of the components. The axial offset distances noted above are measured from a centerline of the sensor 34 to the closest surface of the magnet 50. The closer the sensor 34 is to the magnet 50, the stronger the signal-to-noise ratio may be, but it may be more difficult to consistently closely space the sensor 34 relative to the magnet 50 in high-volume manufacturing.

Figure 2:
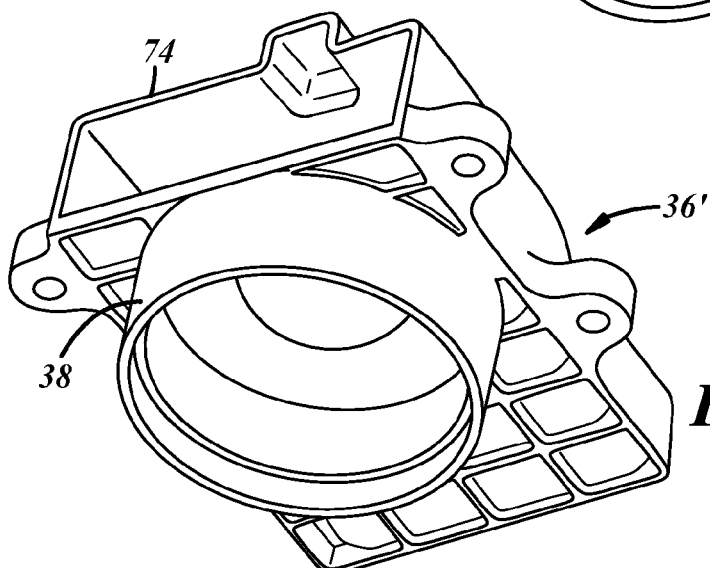
FIG. 2 is perspective view of a control module housing removed from the throttle body.

Further, the sensor 34 may be radially offset from the magnet 50 up to a distance of about the outside diameter of the magnet 50 plus 12 mm, with a range of offset of between about one-half to three-fourths of the outside diameter of the magnet. For example, with a magnet 50 having an outside diameter of 16 mm, the radial offset may be between 0 and 28 mm, with a range of 8 mm to 12 mm being preferred for at least one presently tested sensor, such as the sensor model ZMT32 sold by Zetex Semiconductors. The radial offset distances noted above are measured from a center of the sensor 34 to a center of the magnet 50, or a rotary axis of the magnet 50. For magnets 50 without a circular periphery, then the offset can be measured relative to a major dimension of the magnet 50, where the major dimension is the greatest dimension (e.g. length, width, thickness) of the magnet 50. The further the sensor 34 is from the magnet 50, the greater the likelihood of signal and noise variations, and weaker flux line concentrations. Depending on the particular application, it may be desirable to mount rotary position sensor 34 at a position on circuit board 30 that is as close to the axis 42 of throttle shaft 18 as possible; this includes mounting sensor 34 at a position that is radially inboard of an inside diameter of the magnet 50. That is, where the center of the sensor 34 is not offset farther than an inside radius of the magnet 50. In addition to or instead of radially offsetting the sensor 34, the magnet 50 could be mounted so that it is offset and not coaxial with the throttle valve shaft 18. In an application where the throttle shaft 18 extends through or beyond the circuit board 30, the sensor 34 may be disposed axially between the throttle valve head 16 and the magnet 50. Otherwise, as shown in FIGS. 1, 2 and 4, the magnet 50 may be disposed axially between the sensor 34 and throttle valve head 16.

A consistent magnetic flux field facilitates accurate determination of the throttle shaft rotational position. Changes to the flux field may make determination of the position of the throttle shaft more difficult. By way of an example, ferromagnetic materials within the magnetic field of the magnet 50 may distort the magnetic field, and hence, affect the sensor's determination of the throttle shaft position. To limit or prevent outside influences from affecting or distorting the magnetic field, a buffer may be provided around the magnet 50. The buffer may be an open space or air gap 62, a shield or barrier 64, a magnetic field control or attenuation material or any combination of any of these things.

As shown in FIGS. 2-6, to limit or prevent this from occurring, an annular wall 66 of the throttle body projection 20 that surrounds a bore 68 through which the throttle valve shaft 18 extends can be located radially outwardly of the magnet 50 a distance great enough that a component located outside of the wall 66 will not alter or distort the magnetic field enough to significantly change the operation and output of the sensor 34. Likewise, the mating annular skirt or wall 38 of the control module housing 36 may have a diameter similar to the diameter of the throttle body wall 66 to provide a similar space around the magnet 50 in the area of the module 28. When the seal 40 is provided, a seal around the throttle valve shaft 18 may not be needed because the chamber around the throttle valve shaft is environmentally sealed when the module 28 is assembled onto the projection 20.

The magnet 50 may be located concentrically within the walls 38, 66, providing a uniform buffer around the magnet, if desired. In this example, the buffer includes an annular air gap 62 defined around the magnet 50 as well as walls 38, 66 or layers of material that act as a barrier (and hence, are also labeled with reference number 64 in FIG. 4) to reduce or attenuate the magnetic field outside of the throttle body housing 11 and control module housing 36 so that components outside thereof do not significantly affect the magnetic field or the sensor 34. Accordingly, even relatively small ferromagnetic objects (like a small staple) will not be sufficiently attracted by the magnet 50 to either be held against the throttle body housing 11 or module housing 36, or significantly affect the magnetic field or sensor 34. The air gap 62 could be filled with a material adapted to provide a further barrier or to further attenuate the magnetic field so that the force of any magnetic field present outside of the throttle body housing 11 and module housing 36 is reduced to a desired level.

Accordingly, the buffer spaces the sensor 34 from other components (outside of the throttle body and control module housing) that may disrupt operation of the sensor 34 or may disrupt the magnetic field being sensed. The buffer reduces the likelihood that foreign objects (e.g. staples or other small ferromagnetic objects) may be attracted by the magnetic field and/or adhered or held against the throttle body 10 by the magnet field and thereby disrupt or alter the magnetic flux lines or field.

The buffer may create a zone around the magnet wherein ferromagnetic objects that are not part of the throttle body or module housing are not located or attracted. The zone may be represented by a sphere 70 (represented by a circle in dashed lines in FIG. 4) having its center at the magnet 50. The size of the sphere 70 may vary depending upon the strength of the magnet, shape of the magnet, or both, with a stronger magnet requiring a larger diameter sphere, and a weaker magnet requiring a smaller diameter sphere. Of course, the sphere 70 is just one simple way to define the zone around the magnet 50 and the actual buffer zone may have other shapes, regular or irregular, as desired. Where a material barrier 64 is used, the buffer zone can be smaller because of the attenuation of the magnetic field caused by the material barrier.

In one example, a magnet having a flux energy density of between 30-40 MegaGauss-Oerstead is used, and the diameter of the walls 38, 66 of the module housing 36 and throttle body housing 11 are about 45 mm. This provides an annular gap 62 around the magnet 50 that is about 14-15 mm when the diameter of the magnet is about 16 mm. For a magnet have a flux energy density in the range noted, a buffer zone of 10-15 mm outside of the magnet perimeter has been found to be sufficient to reduce interference with the magnetic field and permit proper operation of the sensor 34 without erroneous signal output. This buffer zone may extend in all directions around the magnet. The buffer zone may be 0.5 to 1.5 times the greatest dimension of the magnet or greater, or with a circular magnet, the buffer zone may be 1.5 times the radius of the magnet or greater. In at least some implementations, represented by this example, calculations can show the magnetic field strength at the exterior of the buffer is between about 2% and 6% of the maximum magnetic field strength of the magnet at any given time. Also, in at least some implementations, a variation in a signal provided by a magnetic sensor 34 caused by an object outside of the buffer is not greater than 3%. Accordingly, in at least some implementations, the magnetic field present outside of the buffer is low enough a foreign object outside of the buffer and weighing at least 0.05 g is not held against the housing by only the magnetic field. Here, a foreign object may be considered to be an object that is not part of the apparatus with which the magnet and sensor are used.

For example, the module housing 36, as shown in FIG. 4, includes a thinner section 72 with a reduced height or thickness. As shown in FIG. 2, the thinner section 72 can be reduced or eliminated in a modified housing 36' to provide the outside surface of the upper wall 74 of the housing 36' at a desired distance from the magnet 50 to provide a desired buffer zone between the magnet and the outside surfaces of the throttle body housing 11 and the module housing 36'. Of course, other factors may be relevant, including the thickness and material of the walls 38, 66 and other walls and structures in the throttle body and control module. In one implementation, the throttle body housing 11 is an aluminum casting, the control module housing 36 is a molded plastic and the walls 38, 66 (and other walls of these structures) are about 2 mm thick.

Figure 5:
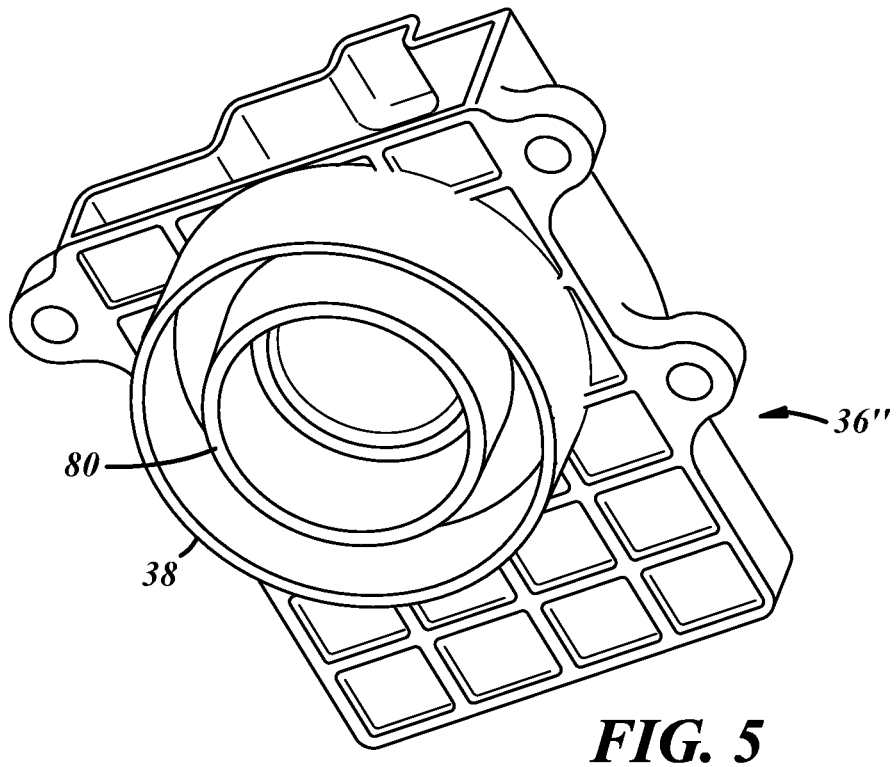
FIG. 5 is a perspective view of a control module housing that may be used with the throttle body.
Figure 6:
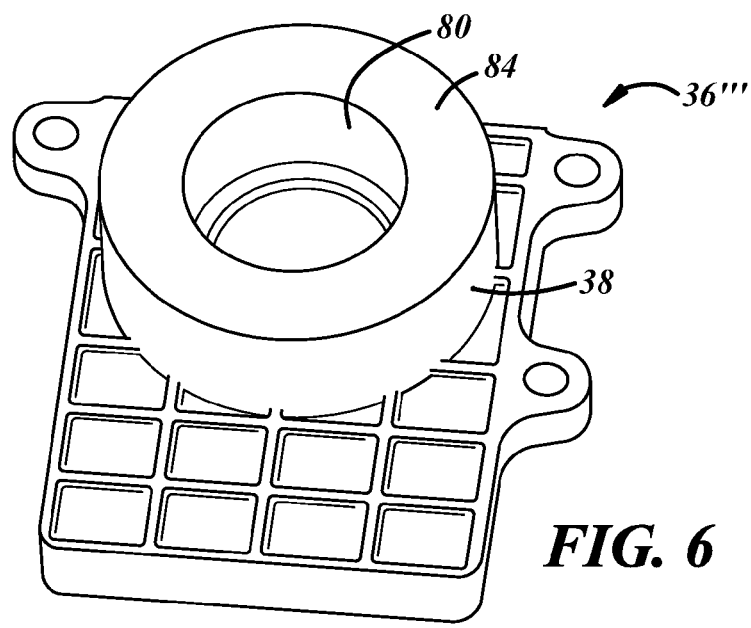
FIG. 6 is a perspective view of a control module housing that may be used with the throttle body.

In the implementation of FIG. 5, a modified module housing 36" may include an annular second wall 80 disposed radially inwardly of the first wall 38. The second wall 80 may provide a further shield that attenuates the magnetic field, and/or the gap between the first and second walls 38, 80 may be filled (partially or completely) by another material to provide a further barrier for the sensor 34 and/or attenuate the field of the magnet 50. An insert or cap may be provided between the lower ends of the walls 38, 80, to prevent contaminants or metal debris from entering the space between the walls. The inner, second wall 80 may also fit on a narrower outer diameter wall of a modified throttle body, with the second wall 80 sliding over the throttle body wall 66 and the outer, first wall 38 providing the buffer around the magnet 50, with or without any material or other component disposed between the first and second walls. In the implementation of a module housing 36''' shown in FIG. 6, the ends of the first and second walls 38, 80 are joined by a lower wall 84, rather than being open and spaced apart as in FIG. 5. The space between the walls 38, 80 in FIG. 6 may be open, solid or filled with another material, as desired. The material may be a natural or synthetic material, such as, but not limited to, foam, plastic, wood, or metal. Here, the inner wall 80 would fit around the wall 66 of the throttle body housing 11 and the outer wall 38 and space between the walls 38, 80 would provide a further buffer for the sensor 34 and magnet 50.

Figure 7:
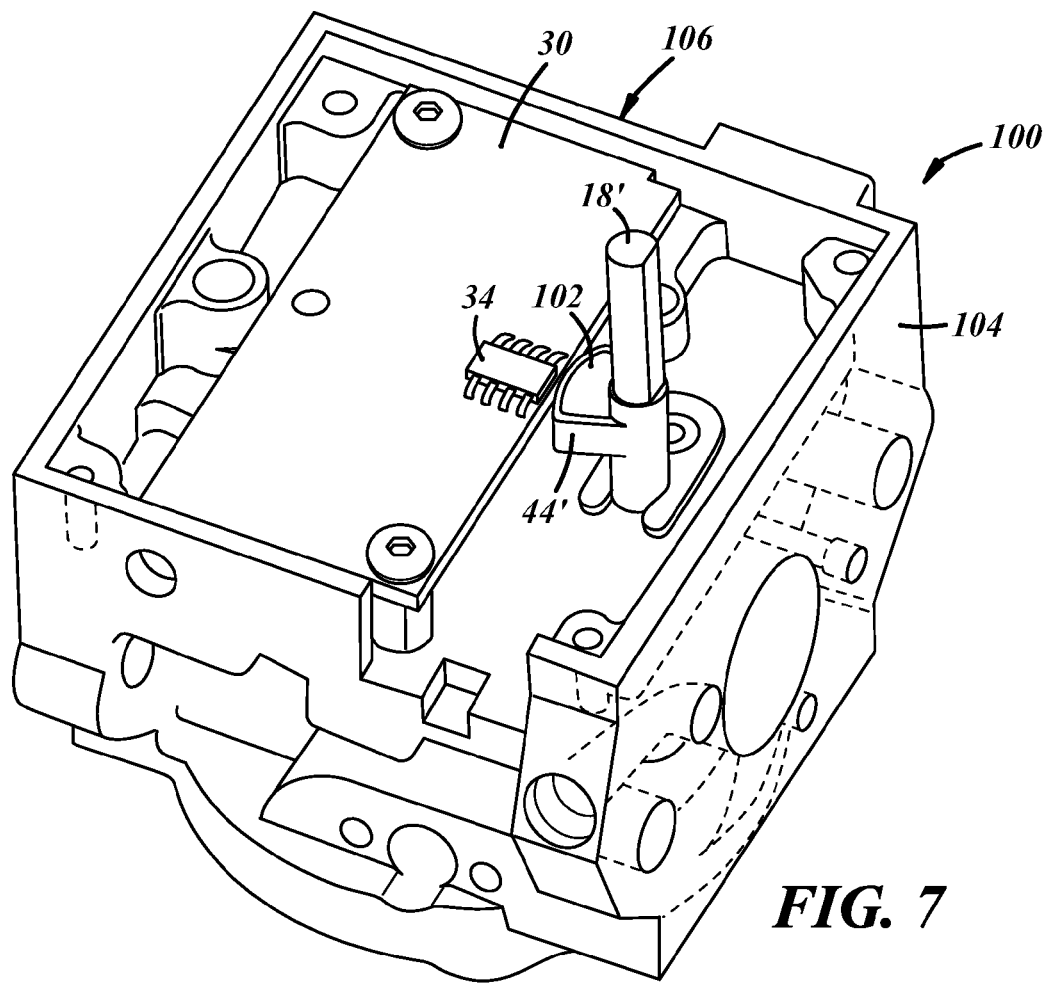
FIG. 7 is a perspective view of a carburetor including a rotary position sensor associated with a throttle valve.

FIG. 7 illustrates another fluid control device, a carburetor 100, with which the sensor 34 and a magnet 102 may be used. A cover of the carburetor 100 has been removed to show the magnet 102 and sensor 34 arrangement. The control module, including the sensor 34 and circuit board 30, may be carried on a housing or body 106 of the carburetor 100, and beneath the cover (not shown). In this implementation, the magnet 102 is carried by a rotor component 44' that is secured to a throttle valve shaft 18' so that the magnet is rotated as the throttle valve shaft rotates. The magnet 102 may be a portion of a ring, or any other shape. In an idle position of the throttle valve, the magnet 102 may be located opposite to the closest outside wall 104 of the body 106 of the carburetor 100, as shown in FIG. 7. This positions the magnet 102 a desired distance from an outer wall of the carburetor body 106 to limit or prevent distortion of the magnet field due to other components or metallic debris/objects that may be located, even temporarily, near the carburetor body.

Figure 8:
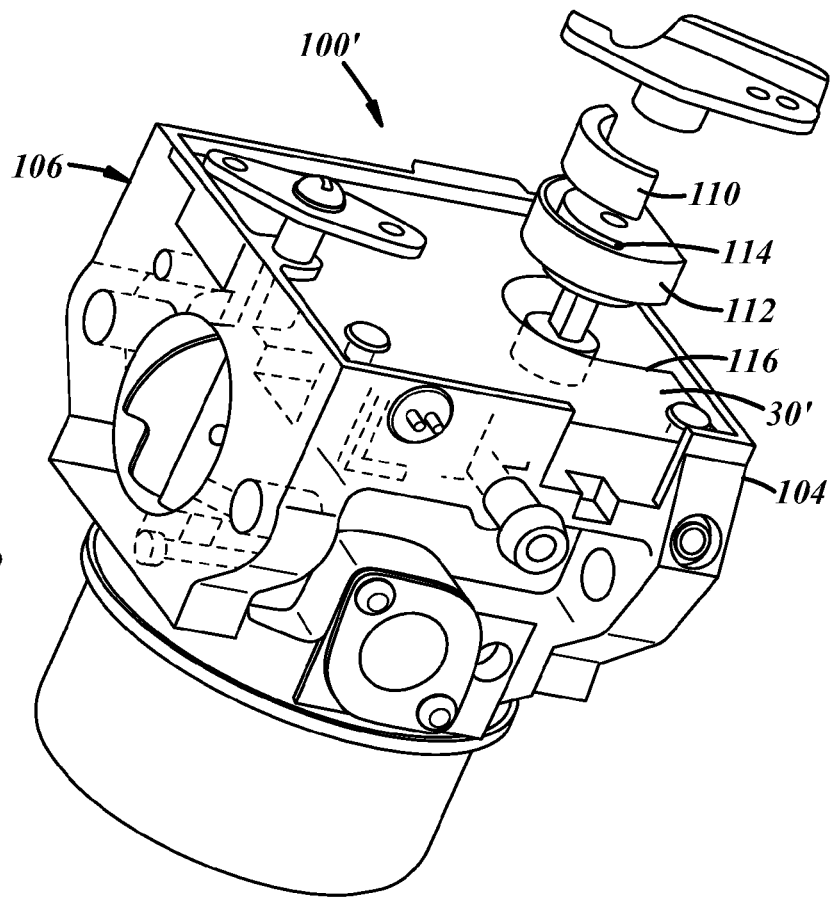
FIG. 8 is a perspective and partially exploded view of the carburetor including another rotary position sensor arrangement.
Figure 9:
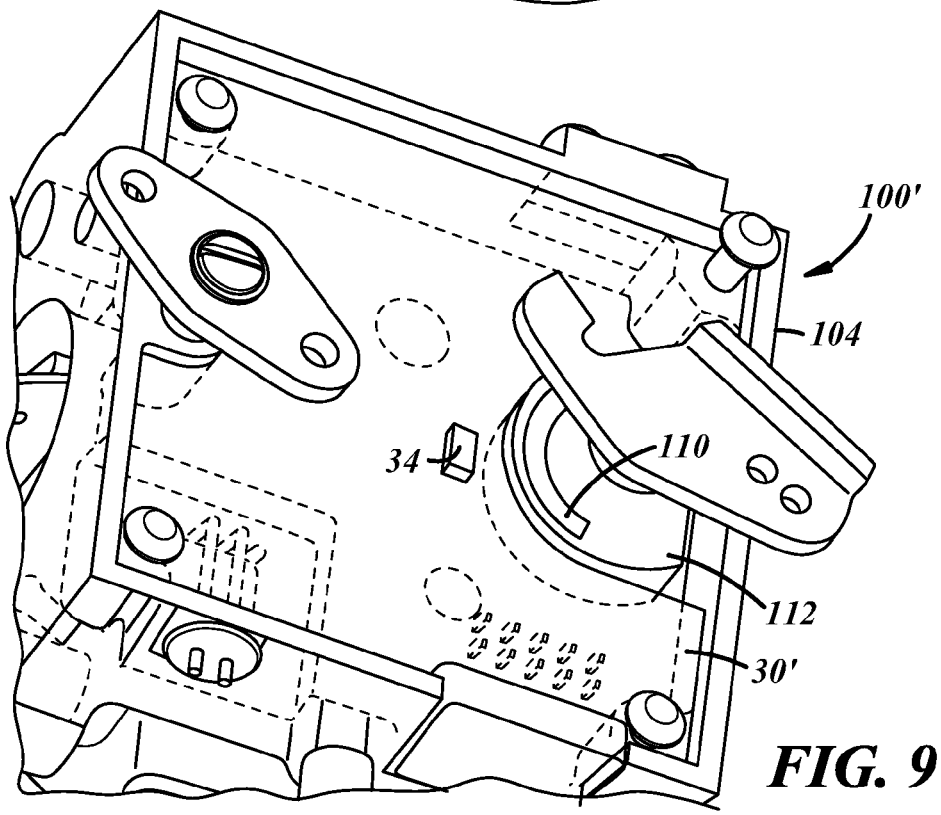
FIG. 9 is a fragmentary perspective view of a portion of the carburetor of FIG. 8.

FIGS. 8 & 9 illustrate another magnet 110 and rotor component 112 arrangement for a carburetor 100' where the magnet 110 is a portion of a ring and is received in a complementary pocket 114 of the rotor component 112. Here, the throttle valve shaft 18' may pass through the circuit board 30, or through a cutout 116 in the circuit board. The magnet 110, like the magnet 102 shown in FIG. 7, may be positioned away from the closest outside wall 104 or surface of the carburetor body 106.

As described herein, the buffer may include a plurality of walls, structures, inserts and/or an air gap. The sensor can be calibrated with various walls, structures and air gaps present so that operation of the sensor with these features provides an accurate indication of the position of the throttle valve (or other rotary component). The walls of the throttle body and control module are preferably not magnetic, although they could be.

The operation of the sensor 34, and various other circuit components like A/D converters, amplifiers and the like, may be constructed and arranged as shown in U.S. Patent Application Publication No. 2010/0258099. Accordingly, the description of the related circuitry and components will not be further described herein.

It should be appreciated that the systems, circuits, components and methods described above are only exemplary in nature and that one of a number of different alternatives could be used. For instance, any combination of the following components could be used: magnetic flux or field influencing components, additional magnets including bias magnets, Hall effect sensors, contact-type sensors, optical sensors, multiple magnets, magnets other than arcuate shaped magnets, a single-bridge sensor having only one resistive bridge, temperature compensation means, low profile rotary sensors such as PIHER sensors, etc. These are, of course, only some of the possibilities.

Other forms of non-contact rotary position sensors instead may be used. For example, a metallic paddle (not shown) may be attached to the throttle shaft in close proximity to sets of spiral curves (not shown) etched into the surface of the circuit board. The curves may be excited by a carrier or demodulated waveform and, as the paddle scans the circular matrix, the control module could detect the difference in waveforms signal between the two curve sets as the paddle scans proportional to the commanded throttle position, thereby providing an indication of engine load without typical noise or step signal constraints imposed by more costly and conventional electromechanical or electro-resistive rotary position sensing devices.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A rotary position sensor assembly for determining the rotary position of a rotary component, comprising:
    a magnet carried by the rotary component for rotation with the rotary component;
    a sensor responsive to a characteristic of a magnetic field that changes as the magnet rotates or is rotated;
    a buffer zone around the magnet and the sensor to limit distortion of the magnetic field which buffer zone is at least 0.5 times the largest dimension of the magnet;
    a housing enclosing the buffer zone, magnet and sensor and having at least one wall and the housing prohibiting a foreign object from passing into the buffer zone; and
    wherein the buffer zone includes a material surrounding at least a portion of the magnet to attenuate the magnetic field present outside of the housing.

2. The assembly of claim 1 wherein the buffer zone includes an air gap.

3. A rotary position sensor assembly for determining the rotary position of a rotary component, comprising:
    a magnet carried by the rotary component for rotation with the rotary component;
    a sensor responsive to a characteristic of a magnetic field that changes as the magnet rotates or is rotated;
    a buffer zone around the magnet and the sensor to limit distortion of the magnetic field which buffer zone is at least 0.5 times the largest dimension of the magnet;
    a housing enclosing the buffer zone, magnet and sensor and having at least one wall and the housing prohibiting a foreign object from passing into the buffer zone; and
    wherein the buffer zone and the housing reduces the magnetic field outside of the housing to the point that a foreign ferromagnetic object outside of the housing and weighing at least 0.05 g is not held against the housing by only the magnetic field.

4. The assembly of claim 3 wherein the at least one wall of the housing is of metal or plastic material.

5. The assembly of claim 3 wherein the buffer zone includes an air gap and a material barrier.

6. The assembly of claim 3 wherein the at least one wall of the housing includes a plurality of walls collectively surrounding the buffer zone, magnet and the sensor.

7. The assembly of claim 3 wherein the buffer zone surrounding the magnet and the sensor and in which an object cannot pass is 0.5 to 1.5 times the largest dimension of the magnet.

8. A rotary position sensor assembly for determining the rotary position of a rotary component, comprising:
    a magnet carried by the rotary component for rotation with the rotary component;
    a sensor responsive to a characteristic of a magnetic field that changes as the magnet rotates or is rotated;
    a buffer zone around the magnet and the sensor to limit distortion of the magnetic field which buffer zone is at least 0.5 times the largest dimension of the magnet;
    a housing enclosing the buffer zone, magnet and sensor and having at least one wall and the housing prohibiting a foreign object from passing into the buffer zone; and
    wherein the magnetic field strength at the exterior of the housing surrounding the buffer zone is between about 2% and 6% of the maximum magnetic field strength of the magnet at any given time.

9. A rotary position sensor assembly for determining the rotary position of a rotary component, comprising:
    a magnet carried by the rotary component for rotation with the rotary component;
    a sensor responsive to a characteristic of a magnetic field that changes as the magnet rotates or is rotated;

a buffer zone around the magnet and the sensor to limit distortion of the magnetic field which buffer zone is at least 0.5 times the largest dimension of the magnet;

a housing enclosing the buffer zone, magnet and sensor and having at least one wall and the housing prohibiting a foreign object from passing into the buffer zone; and wherein a variation in a signal provided by a magnetic sensor caused by a foreign ferromagnetic object outside of the housing of the buffer zone is not greater than 3%.

10. A fluid flow control device for a combustion engine, comprising:

a housing;

a throttle valve carried by the housing for rotation to vary a flow of fluid past the throttle valve;

a magnet carried by the throttle valve for rotation with the throttle valve;

a sensor responsive to a characteristic of a magnetic field that changes as the magnet rotates or is rotated;

a buffer zone around the magnet and the sensor to limit distortion of the magnetic field that may be caused by any objects outside of the buffer zone that are not part of the fluid flow control device;

the buffer zone is at least 0.5 times the largest dimension of the magnet;

a buffer housing enclosing the buffer zone, magnet and sensor and having at least one wall, and the buffer housing prohibiting a foreign object from passing into the buffer zone; and wherein the buffer zone includes a material surrounding at least a portion of the magnet and the sensor to attenuate the magnetic field present outside of the buffer zone.

11. A fluid flow control device for a combustion engine, comprising:

a housing;

a throttle valve carried by the housing for rotation to vary a flow of fluid past the throttle valve;

a magnet carried by the throttle valve for rotation with the throttle valve;

a sensor responsive to a characteristic of a magnetic field that changes as the magnet rotates or is rotated;

a buffer zone around the magnet and the sensor to limit distortion of the magnetic field that may be caused by any objects outside of the buffer zone that are not part of the fluid flow control device;

the buffer zone is at least 0.5 times the largest dimension of the magnet;

a buffer housing enclosing the buffer zone, magnet and sensor and having at least one wall, and the buffer housing prohibiting a foreign object from passing into the buffer zone; and wherein the buffer zone and buffer housing reduces the magnetic field outside of the buffer housing to the point that a foreign ferromagnetic object outside of the buffer housing and weighing at least 0.05 g is not held against the buffer housing by only the magnetic field.

12. The device of claim 11 wherein the buffer zone includes an air gap.

13. The device of claim 11 wherein the least one wall of the buffer housing includes a wall of metal or plastic material.

14. The device of claim 11 wherein the buffer zone includes an air gap and a material barrier.

15. The device of claim 11 wherein the at least one wall of the buffer housing includes a plurality of walls collectively surrounding the magnet and the sensor.

16. The device of claim 11 wherein the buffer zone is at least 0.5 to 1.5 times the largest dimension of the magnet.

17. The device of claim 11 wherein a variation in a signal provided by a magnetic sensor caused by an object outside of the buffer housing is not greater than 3%.

18. A fluid flow control device for a combustion engine, comprising:

a housing;

a throttle valve carried by the housing for rotation to vary a flow of fluid past the throttle valve;

a magnet carried by the throttle valve for rotation with the throttle valve;

a sensor responsive to a characteristic of a magnetic field that changes as the magnet rotates or is rotated;

a buffer zone around the magnet and the sensor to limit distortion of the magnetic field that may be caused by any objects outside of the buffer zone that are not part of the fluid flow control device;

the buffer zone is at least 0.5 times the largest dimension of the magnet;

a buffer housing enclosing the buffer zone, magnet and sensor and having at least one wall, and the buffer housing prohibiting a foreign object from passing into the buffer zone; and wherein the magnetic field strength at the exterior of the buffer housing is not greater than 6% of the maximum magnetic field strength of the magnet at any given time.

* * * * *